Feb. 13, 1962   G. C. NOLL ET AL   3,021,016
OUTRIGGERS FOR CRAWLER CRANES, SHOVELS, HOES AND THE LIKE
Filed Dec. 15, 1959   3 Sheets-Sheet 1
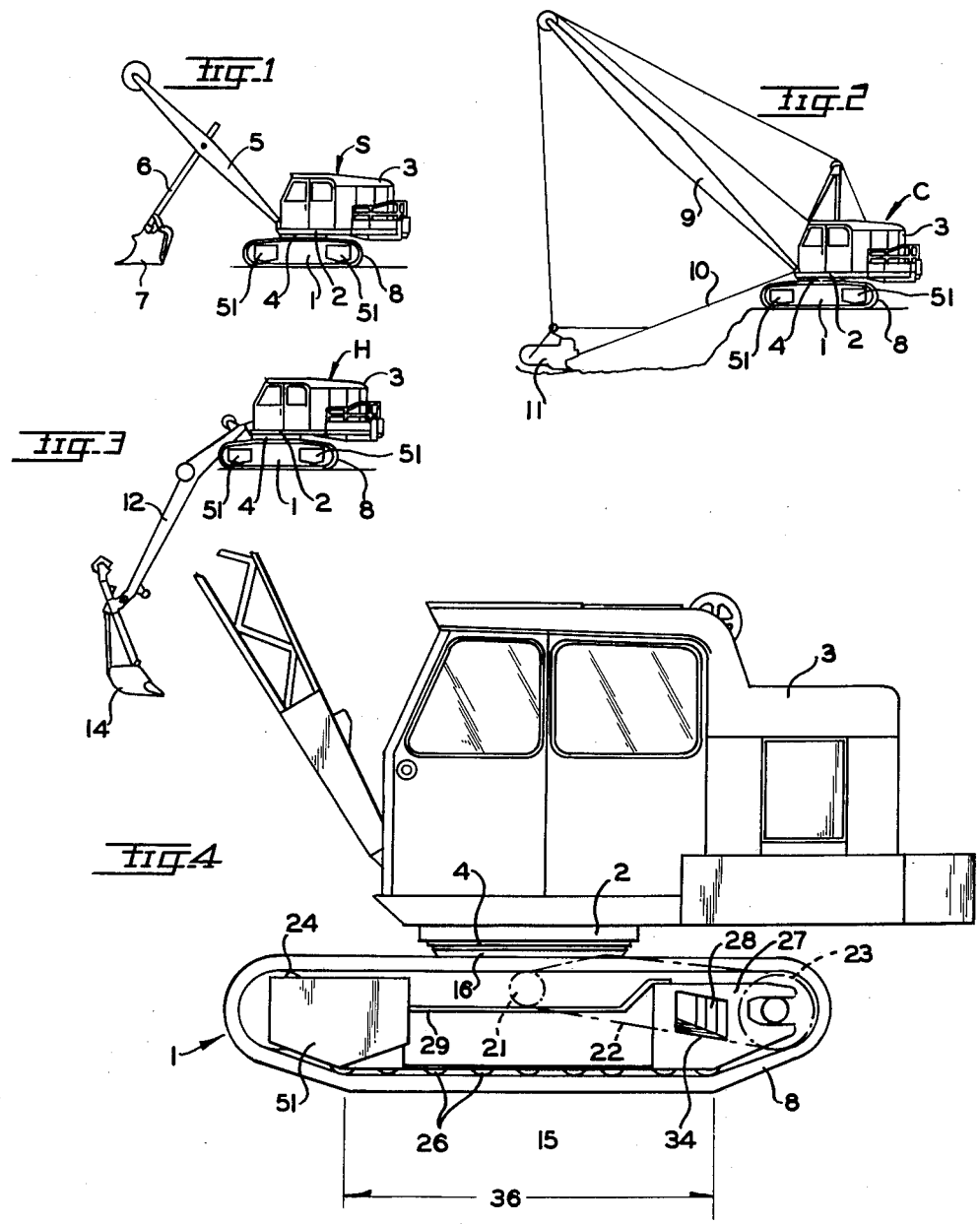
INVENTORS
GEORGE C. NOLL &
PAUL E. WESEBAUM
BY
Oberlin, Maky & Donnelly
ATTORNEYS

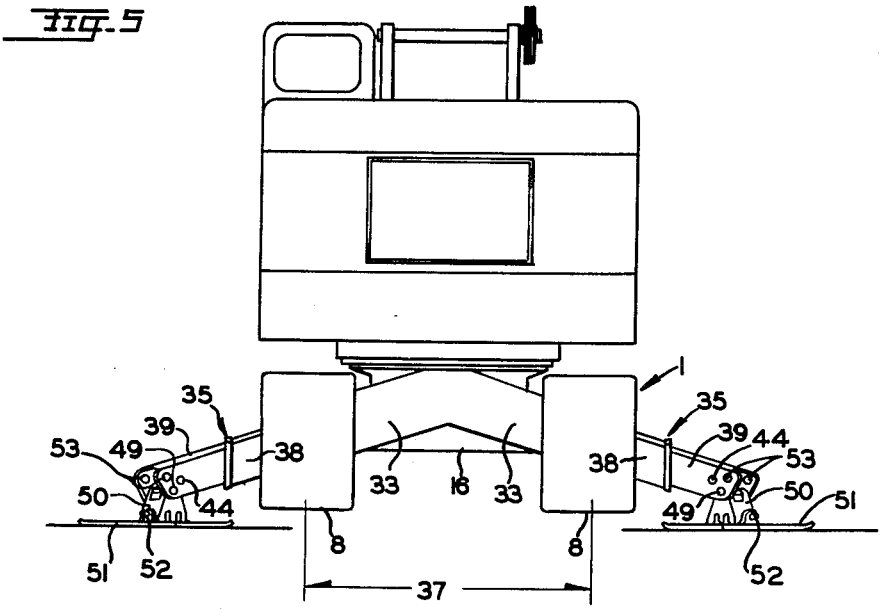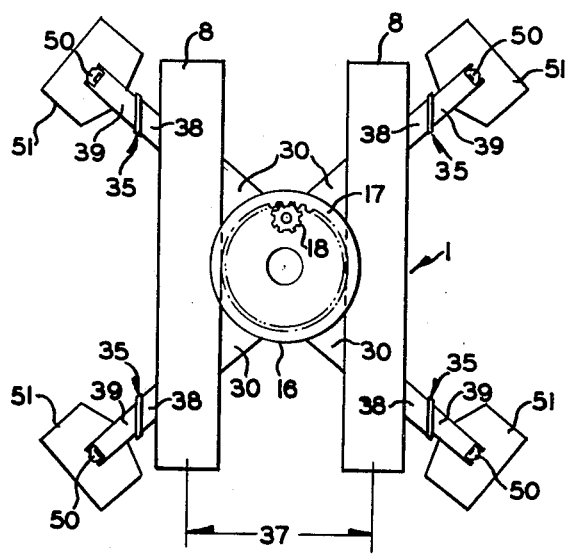

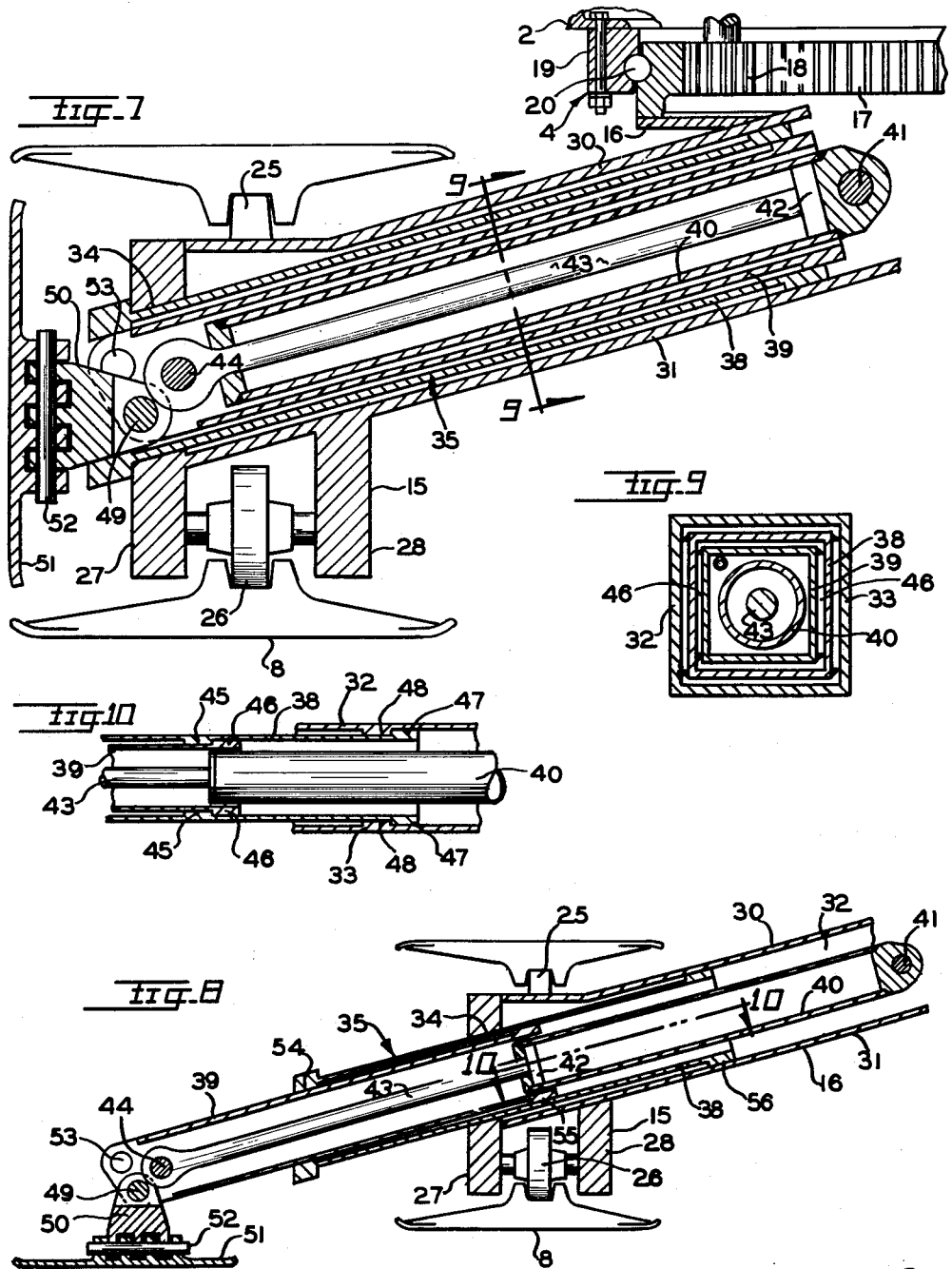

3,021,016
Patented Feb. 13, 1962

3,021,016
OUTRIGGERS FOR CRAWLER CRANES, SHOVELS, HOES AND THE LIKE
George C. Noll and Paul E. Wesebaum, Elyria, Ohio, assignors to The Thew Shovel Company, Lorain, Ohio, a corporation of Ohio
Filed Dec. 15, 1959, Ser. No. 859,723
14 Claims. (Cl. 212—145)

The present invention relates generally as indicated to outriggers for crawler cranes, shovels, hoes and like hoisting and excavating equipment and, more particularly, to power operated outriggers which, in their retracted positions, are disposed within the overall width of the crawler carrier and which, in their operating positions, project laterally of the carrier to ground-engaging positions to increase the stability rating of the equipment.

In most states, if not all, the legal width limit for highway transport for equipment of this nature is 8'-0" overall and in some states wider equipment, such as say, of 9'-0" width may be transported on the highways by application for a special permit. There are also width limitations for transportation of equipment of this nature on railroads. In view of the nature of the drive and guide of the crawler treads the side tipping points may be less than 6' apart when the overall crawler tread width is 8' and, obviously, such narrow spread of the tipping points greatly decreases the capacity of the equipment for handling loads on the crane boom over the side, or in the bucket or scoop of a power shovel or hoe.

Another consideration is the clearance height of the equipment which, for practical purposes, should not exceed about 12'-0" when supported on the bed of the transporting trailer. Accordingly, this has made it impractical to provide outrigger beams across the crawler carrier and above the crawler treads because this would interfere with the swing of the turntable and superstructure unless the latter is raised to clear such outrigger beams. This would, of course, substantially increase the clearance height and thus hamper the transport of the equipment from one place of use to another.

Likewise, in crawler carrier equipment, it is desired to keep the space between the crawler treads open and unobstructed to clear the dragline cable of a crane boom equipped with a dragline bucket and to clear shovel buckets or hoe booms operating at close points fore and aft of the crawler carrier. Accordingly, it is not feasible to have outrigger beams extending transversely between the front and rear portions of the crawler treads, since this would interfere with the operations aforesaid and also would require special mountings for the tread drive and guide sprockets. Similarly, the provision of laterally extending outrigger beams at the middle of the crawler carrier raises a number of installation problems concerning the driving and steering mechanism for the carrier and, in addition, such central outrigger beams would not afford any added fore and aft stability.

Accordingly, it is a principal object of this invention to provide outriggers which are so located in the crawler carrier as to be disposed wholly within the overall width dimensions of the carrier when retracted and which, when protracted or extended, greatly increase the stability rating of the equipment.

It is another object of this invention to provide crawler carrier outriggers as foresaid, which are so located that a small clearance between the turntable and the crawler treads may be maintained to thereby keep the height of the equipment at a minimum.

It is another object of this invention to provide outriggers for crawler carriers that keep the spaces between the crawler treads free and open while greatly increasing both the fore and aft and side stability of the equipment.

It is another object of this invention to provide outriggers for crawler carriers that may be simultaneously movable to make possible the extension and retraction of the outriggers in the shortest possible time and that may be separately moved to enable leveling of the equipment on uneven terrain and assuring that each outrigger supports a portion of the weight of the equipment.

It is another object of this invention to provide outriggers for crawler carriers that are self-locking in extended position so as not to require insertion and withdrawal of locking pins or to require reliance upon hydraulic system locking, whereby failure or venting of the hydraulic system does not in any way permit collapse of the outriggers from carrier supporting positions.

It is another object of this invention to provide outriggers for crawler carriers that are in the form of inclined beams that are slide-guided in the carrier frame for simultaneous lateral outward and downward and forward (or rear) movement to ground-engaging position to provide widely spaced apart tipping points, both fore and aft of the carrier and to the sides as well, the angles of inclination of the outrigger beams being such that they are frictionally locked against inadvertent retraction due to upward forces exerted on the ground-engaging floats thereof.

It is another object of this invention to provide outriggers for crawler carriers in which the outrigger beams are provided with pivotally mounted floats that automatically swing to ground-engaging position when the beams are extended and which automatically fold up to generally vertical position between the top and bottom runs of the respective crawler treads and inside the outer edges of the respective crawler treads.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIGS. 1, 2 and 3 are schematic drawings of a power shovel, crane, and hoe, showing certain conditions of operation which render it non-feasible to install outriggers adjacent the ends of the crawler treads and thereabove;

FIG. 4 is a side elevation view of a crawler carrier for hoisting or excavating equipment provided with power operated outriggers in accordance with the present invention, the outrigger at the left of FIG. 4 being shown in its retracted position and the outrigger at the right having been omitted to show outrigger guide opening formed in the side frame of the crawler carrier;

FIG. 5 is a rear elevation view as viewed from the right-hand side of FIG. 4 showing the outriggers in their extended positions with the floats thereof in ground-engaging position, and if desired the equipment may be actually lifted from the ground for leveling the same or to distribute its entire weight on the extended outriggers;

FIG. 6 is a top plan view of the crawler carrier with the outriggers shown in their extended positions affording greatly spread apart tipping points both fore and aft and to the sides of the carrier;

FIGS. 7 and 8 are cross-section views taken longitudinally through one of the outrigger beams, FIG. 7 showing the outrigger beam in its retracted position wherein the float thereof has been folded into vertical position so as to lie between the crawler treads, and FIG. 8 showing the outrigger beam in its extended position with the float swung down to horizontal ground-engaging position;

FIG. 9 is a transverse cross-section view taken substantially along the line 9—9, FIG. 7; and FIG. 10 is a fragmentary cross-section view taken substantially along line 10—10, FIG. 8.

Referring now more particularly to the drawings, and first to FIGS. 1, 2 and 3, there is shown in FIG. 1 a typical power shovel S comprising a crawler carrier or truck 1 on which the turntable 2 of the superstructure 3 is mounted for vertical swinging about the central vertical axis of the turntable bearing 4. In FIG. 1 the boom 5 has its foot pivotally mounted to the superstructure 3 about a horizontal axis, and has the usual stick 6 and bucket 7 assembly pivotally mounted near the middle thereof. As evident, if outrigger beams were provided to extend transversely across the carrier 1 above the crawler treads 8 thereof, the superstructure 3 and turntable 2 would have to be mounted in elevated position to clear such outrigger beams. Furthermore, such beams may interfere with the vertical swinging movements of the boom 5 and the bucket 7 when digging is done close to the front or rear of the carrier 1.

Similarly, in connection with the power crane C shown in FIG. 2, the provision of outriggers, as aforesaid, would correspondingly raise the superstructure 3 and turntable 2 and would interfere with either the lowering of the boom 9, or with the operation of the dragline cable 10, especially when the bucket 11 is operated close to the front or rear ends of the carrier 1.

Finally, in FIG. 3 is shown a typical power hoe H and here again, traverse outriggers across the top of the crawler treads 8 cannot be used because the superstructure 3 and turntable 2 would have to be raised a corresponding distance and such outriggers may limit the usefulness of the hoe boom 12 and hoe bucket when operated close to the front or rear of the carrier 1.

With the foregoing in mind, reference may now be had to FIGS. 4 to 10 which show in detail a preferred form of outrigger structure for crawler carriers of power shovels, cranes, hoes, and like hoisting and excavating equipment.

As shown in FIGS. 4, 5, 6, and 7 the crawler carrier 1 generally comprises parallel side frames 15 joined together by a transverse center frame 16 which has welded or otherwise affixed on the top thereof, a fixed ring gear 17 that constitutes for example, the non-rotating inner bearing ring of the turntable bearing assembly 4. Meshing with the ring gear 17 is the usual swing pinion which is adapted to be power driven by an engine (not shown) in the cab of the superstructure 3 to thus cause the superstructure 3 and turntable 2 thereof to swing about the vertical central axis of the turntable bearing 4, the outer bearing ring 19 being secured to the turntable 2 as best shown in FIG. 7. The bearing rings 17 and 19 are formed with ball races in which the balls 20 are disposed to connect the superstructure 3 for swinging with respect to the carrier 1. The carrier 1 (see FIG. 4) has sprockets 21 which through chains 22 drive the sprockets 23, the latter in turn, driving the respective crawler treads 8 so as to propel and steer the carrier 1. Again, the engine in the superstructure 3 drives the sprockets 21 through a suitable transmission (not shown) in the center frame 16. Each side frame 15 has, at its respective ends, an idler sprocket 24 and the tread drive sprocket 23 over which the crawler tread 8 is trained as shown. Each side frame 15 is also provided with a top longitudinally extending guide 25 (see FIGS. 7 and 8) for the crawler tread 8 and, in addition, each side frame 15 has a series of guide rollers 26 along the bottom thereof serving to guide and support the bottom run of the crawler tread 8.

In detail, the side frames 15 of the carrier 1 comprise heavy bars 27 and 28 at each end joined together by channel-like members 29 and, in turn, the center crossframe member 16 includes top and bottom plates 30 and 31 which are welded to the side frames 15 and which, together with vertical plates 32 and 33 and the rectangular openings 34 in the bars 27 and 28, form rectangular boxes in which the outrigger beams 35 are longitudinally slide-guided for movement between retracted and extended positions as shown in FIGS. 7 and 8, respectively along paths that are inclined as shown so that when the outrigger beams 35 are moved from retracted to extended ground-engaging positions, they provide for added side and fore and aft stability of the equipment.

In this connection, a typical carrier 1 may have a fore and aft tipping point spread of say, 8'-0" as designated by the dimension line 36 in FIG. 4. With regard to side stability, the side tipping points for a crawler carrier 1 of say 8'-0" overall width, as measured across the outside edges of the treads 8, may be spaced apart only 5'-10" (the center-to-center distance across the crawler guide and support rollers 26 as denoted by the dimension line 37). With the present outrigger arrangement, as clearly shown in FIG. 6, the fore and aft and the side tipping points may be spread out to say 11'-8" which actually doubles the side stability of the carrier 1 and substantially increases the fore and aft stability by nearly 50%.

In this case, there are four outrigger beams 35 arranged to radiate from the center frame 16 as the lateral edges of a square base pyramid as shown in FIG. 6, and each preferably comprises telescoping outer and inner beams 38 and 39 of which the outer beam 38 is longitudinally slide-guided in the respective box of the carrier 1. A hydraulic cylinder 40 is pinned to the carrier 1 by pin 41 and the piston 42 thereof has its rod 43 pinned to the inner beam 39 by pin 44, whereby, when fluid under pressure is admitted into the head end of the cylinder 40, the piston 42 and the inner beam 39 are moved outwardly until the stops 45 and 46 of the beams 38 and 39 engage each other, and thereafter the outer beam 38 is also moved outwardly in unison with the inner beam 39. Additional stops 47 and 48 may be provided on the outer beam 38 and the side walls of the beam guide box to arrest outward movement of the outer beam 38 so that when the outrigger 35 is fully extended as in FIG. 8, only about one half the length of the inner beam 39 projects beyond the outer end of beam 38 and about one half the length of the outer beam 38 projects beyond the side frame 15.

Pivotally connected by the pin 49 to the outer end of the inner beam 39 is a float bracket 50 to which the float 51 is pivotally connected by a pin 52 which is disposed transversely with respect to the hinge pin 49. Accordingly, when the outrigger 35 is in retracted position, as in FIG. 7, the outer beam 38 is engaged with the bracket 50 to swing the float 51 to vertical position between the top and bottom runs of the crawler tread 8.

Now, when the outrigger 35 is extended, as in FIG. 8, the bracket 50 swings down by gravity to permit the float 51 to engage the ground and if the ground is not level, the float 51 can swing about the two pins 49 and 52 to firmly engage the ground. Holes 53 are provided in the inner beam 39 for mounting of the bracket 50 and float 51 in a higher position when the carrier 1 is on ground that slopes upwardly away from the tread 8.

It is to be noted that the angle of downward tilt of the outriggers 35 is such that the upward reaction of the ground will not cause retraction thereof even if the cylinder 40 is vented, the friction at the three areas 54, 55, and 56 preventing any such longitudinal sliding of the outrigger beams 38 and 39.

Other modes of applying the principle of the invention may be employed, change being made as regards the details described, provided the features stated in any of the following claims, or the equivalent of such, be employed.

We therefore particularly point out and distinctly claim as our invention:

1. In hoisting, excavating, and like equipment, the combination of a crawler carrier; a superstructure journalled on said carrier for swinging about a vertical axis; an outrigger beam longitudinally slidably mounted on said carrier from a retracted position within the sides and ends of said carrier to a protracted stabilizing position with one end engaging the ground at a point spaced outwardly of said carrier, and power means for so moving said outrigger beam, said beam comprising inner and outer tubular sections which are telescoped one within the other in the retracted position of said beam; said beam being mounted for sliding along an inclined path such that the ground-engaging end simultaneously moves downwardly and outwardly as said beam is moved to protracted position, the inclination of the path of movement of said beam being such that said beam is frictionally locked against retraction by upward reaction of the ground on the ground-engaging end thereof.

2. In hoisting, excavating, and like equipment, the combination of a crawler carrier; a superstructure journalled on said carrier for swinging about a vertical axis; an outrigger beam longitudinally slidably mounted on said carrier from a retracted position within the sides and ends of said carrier to a protracted stabilizing position with one end engaging the ground at a point spaced outwardly of said carrier, and power means for so moving said outrigger beam, said beam comprising inner and outer tubular sections which are telescoped one within the other in the retracted position of said beam; said beam being mounted for sliding along an inclined path such that the ground-engaging end simultaneously moves downwardly, sidewise, and endwise of said carrier as said beam is moved to protracted position so as to engage the ground at a point which is spaced outwardly of an end and side of said carrier.

3. In hoisting, excavating, and like equipment, the combination of a carrier having a center carrier frame, parallel side frames secured to said center frame, and endless crawler treads movably guided on said side frames for propelling said carrier; a superstructure journalled on said center frame and provided with power drive means operatively connected with said carrier selectively to swing said superstructure about a vertical axis and to drive said crawler treads; said side frames being formed with openings adjacent their ends and between the top and bottom portions of said crawler treads; and outrigger beams longitudinally slidably mounted in the respective openings from retracted positions whereat their ends are within the sides and ends of said carrier to protracted stabilizing positions whereat the outer ends of said beams engage the ground at points spaced outwardly of said carrier.

4. The equipment of claim 3 wherein said beams are mounted for sliding along inclined paths such that the respective ground-engaging ends simultaneously move downwardly and outwardly as said beams are moved to protracted positions.

5. The equipment of claim 3 wherein said beams are mounted for sliding along inclined paths such that the respective ground-engaging ends simultaneously move downwardly and outwardly as said beams are moved to protracted positions, the inclinations of the paths of movement of said beams being such that said beams are frictionally locked against retraction by upward reaction of the ground on the ground-engaging ends thereof.

6. The equipment of claim 3 wherein said beams extend generally diagonally of said carrier so that in their protracted positions they impart both side and end stability to said carrier.

7. An outrigger for hoisting, excavating, and like equipment comprising a support structure; an extensible beam including an outer beam section mounted on said support structure for longitudinal sliding movement from retracted to protracted position; an inner hollow beam section of complemental cross-section longitudinally slidable in said outer beam section to constitute an extension thereof and having an end adapted to move to ground-engaging position in response to longitudinal outward movements of said beam sections relative to each other and to said support structure; interengageable stops on said beam sections limiting the extent of outward longitudinal movement of said inner beam section with respect to said outer beam section; and a fluid piston-cylinder assembly having one of its ends connected to said inner beam section and the other of its ends connected to said support structure; said assembly having a stroke longer than such limited movement of said inner beam section whereby, when said assembly is extended, said inner beam section is first moved outwardly until said stops are interengaged, whereafter, upon continued extension of said assembly, said beam sections are moved longitudinally in unison with respect to said support structure.

8. The outrigger of claim 7 wherein such one end of said assembly is connected to said inner beam section adjacent the ground-engaging end thereof.

9. The outrigger of claim 7 wherein said beam sections are hollow, and said assembly is disposed within said inner beam section and has such one end connected adjacent the ground-engaging end.

10. The outrigger of claim 7 wherein said beam sections are of hollow polygonal cross-section shape, and said assembly includes a cylinder of circular cross-section disposed within said inner beam section with a fluid supply line connected to said cylinder and extending longitudinally in the space between said cylinder and one of the corners of said inner beam section.

11. The outrigger of claim 7 wherein said assembly, when retracted, and said beam sections are of approximately the same length whereby said beam, when extended by the full stroke of the piston of said assembly, is approximately twice as long as the retracted length of said assembly and the nested length of said beam sections.

12. In hoisting, excavating, and like equipment, the combination of a carrier; a superstructure journalled on said carrier for swinging about a vertical axis; an outrigger beam longitudinally slidably mounted on said carrier from a retracted position to an extended stabilizing position with one end engaging the ground at a point spaced outwardly of said carrier, power means for so moving said outrigger beam, said beam being mounted for sliding movement along an inclined linear path such that the ground-engaging end simultaneously moves downwardly and outwardly as said beam is moved to extended position, the inclination of the path of movement of said beam being such that said beam is frictionally locked against retraction by upward reaction of the ground on the ground-engaging end thereof.

13. The equipment of claim 12 wherein the ground-engaging end of said beam has a float pivotally mounted thereon which, in the retracted position of said beam, is swung up to lie in a generally vertical plane.

14. The equipment of claim 12 wherein said beam includes polygonal cross-section shape beams telescoped one within the other, and said power means comprises a piston-cylinder assembly for so moving the inner section relative to the outer section.

References Cited in the file of this patent

UNITED STATES PATENTS

| | | |
|---|---|---|
| 733,128 | Bennett | July 7, 1903 |
| 1,307,545 | Ferris | June 24, 1919 |
| 1,929,416 | Fykse | Oct. 10, 1933 |
| 2,131,479 | McGiffert et al. | Sept. 27, 1938 |
| 2,740,538 | Felkner | Apr. 3, 1956 |
| 2,777,586 | Boysen | Jan. 15, 1957 |

Disclaimer

3,021,016.—*George C. Noll* and *Paul E. Wesebaum*, Elyria, Ohio. OUTRIGGERS FOR CRAWLER CRANES, SHOVELS, HOES AND THE LIKE. Patent dated Feb. 13, 1962. Disclaimer filed Aug. 20, 1969, by the assignee, *Koehring Company*.

Hereby enters this disclaimer to claim 12 of said patent.

[*Official Gazette December 30, 1969.*]